United States Patent [19]

Rieger

[11] Patent Number: 4,474,890
[45] Date of Patent: Oct. 2, 1984

[54] HORIZONTAL CONTAINER FOR PROCESSING WINE GRAPE MUST

[76] Inventor: Herbert Rieger, Talstrasse 33, D 7121 Ingersheim, Fed. Rep. of Germany

[21] Appl. No.: 339,296

[22] Filed: Jan. 15, 1982

[30] Foreign Application Priority Data

Jan. 19, 1981 [DE] Fed. Rep. of Germany ....... 3101510

[51] Int. Cl.³ .............................................. C12M 1/02
[52] U.S. Cl. ..................................... 435/316; 435/813
[58] Field of Search ......................... 435/316, 287, 819

[56] References Cited

U.S. PATENT DOCUMENTS

| 2,535 | 11/1842 | Edday | 435/287 X |
| 2,653,724 | 9/1953 | McBride | 222/460 |
| 3,062,724 | 11/1962 | Reusser | 435/316 X |
| 3,910,173 | 10/1975 | Zepponi | 99/277.1 |
| 4,374,804 | 2/1983 | Easter | 435/819 X |

FOREIGN PATENT DOCUMENTS 2020612 11/1979 United Kingdom ................... 33/18

Primary Examiner—Ferris H. Lander
Attorney, Agent, or Firm—Burmeister, York, Palmatier, Hamby & Jones

[57] ABSTRACT

The invention relates to a tank-type container for the processing of wine grape must, particularly a fermentation tank for red wine must. The tank is equipped with a slowly rotating agitator having a plurality of longitudinally spaced blades disposed the full length of its shaft extending parallel to the longitudinal axis of the tank. The invention resides in at least one section, preferably an outward section, of the cross-sectional area of the agitator blades parallel to the agitator shaft being larger than the cross-sectional area which is normal to the agitator shaft. The pomace cap floating on the surface of the juice is disintegrated and punched down into the body of the juice by means of the flat wide blade sections.

13 Claims, 7 Drawing Figures

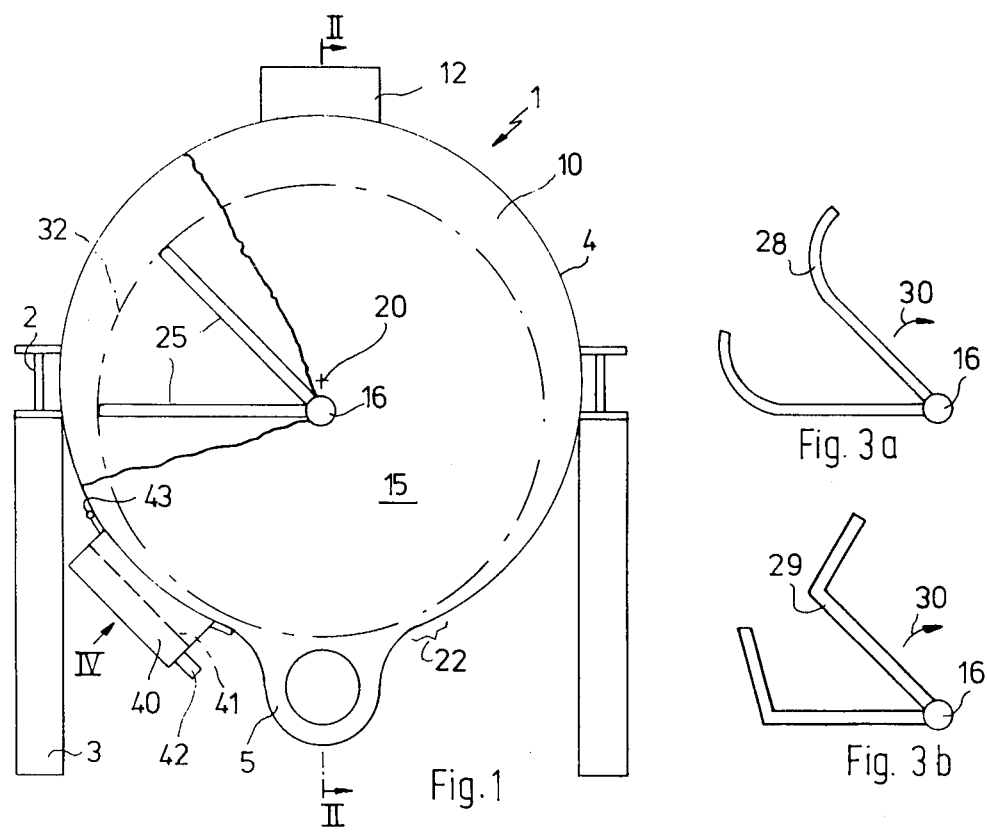
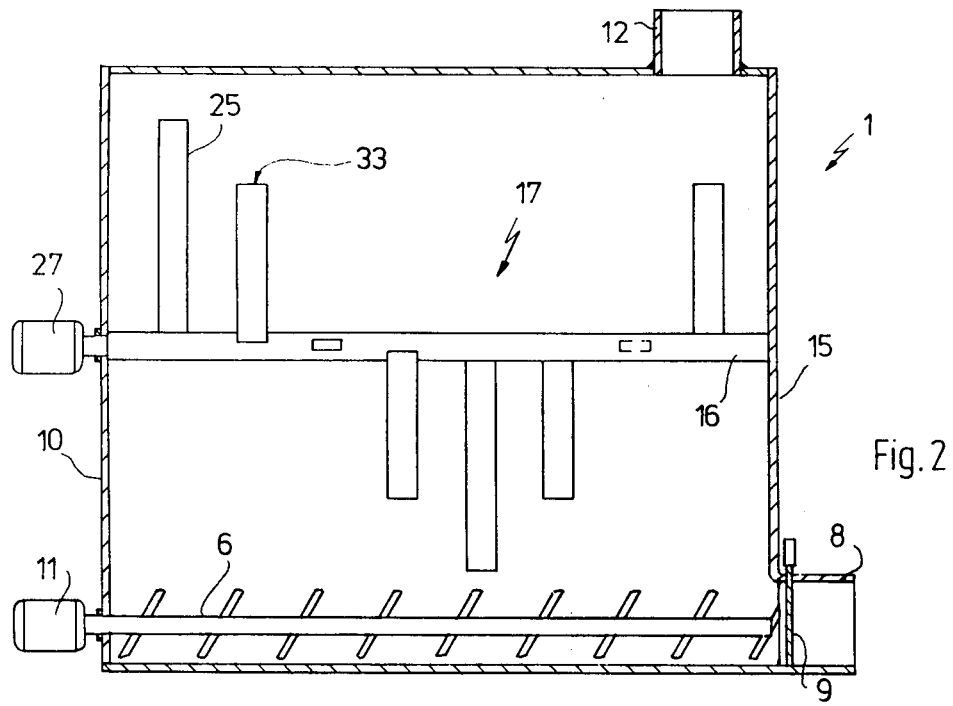

1

HORIZONTAL CONTAINER FOR PROCESSING WINE GRAPE MUST

FIELD OF THE INVENTION

The invention relates to a horizontally disposed fermentation tank made of stainless steel or a plastic material for the processing of wine grape must. The tank is equipped with an agitator rotatable about its shaft disposed parallel to the longitudinal tank axis and having a plurality of longitudinally spaced blades mounted on the agitator shaft.

BACKGROUND OF THE INVENTION

During the fermentation of red wine grape must, a solid cake of pomace builds up and floats on the surface of the fluid. It has been found that the quality of red wine is improved when the juice remains in intimate contact with the pomace for a certain period of time. The required thorough mixing was accomplished heretofore only by having an attendant cut through the pomace cake with a plunger or rake and punch the material down into the body of the juice. This procedure is possible only with open-topped tanks and is, moreover, quite difficult because the fermenting crushed grape mass causes the formation of an extremely dense cake of pomace, called "cap" that floats on the surface of the body of the fluid. Also in the processing of other types of must, as for example white wine grape must, it may be desirable to thoroughly mix all of the must, including the pomace.

GENERAL SUMMARY OF THE INVENTION

The object of the present invention is to establish intimate contact between juice and pomace in such a manner as to be able to accurately control both the exact period of time of mixing and the rate of intensity of mixing.

This is accomplished according to the invention by the particular construction of the agitator means, in that at least in one section of an agitator blade the cross sectional area parallel to the axle of the agitator is larger than the cross sectional area normal to the agitator axle. In some embodiments of the invention, the blades may be flat and plate-shaped over their entire length, or only the portion forming the free end may be wider than the rest of the blade. These blades or mixing paddles serve to break up the pomace cap. Their generally flat portions, as they emerge from the juice, scoop up increments of the pomace cap and at the opposite side plunge them back down into the body of the juice, effecting a constant lifting and lowering of the pomace and thus a good mixing of the pomace with the juice.

PRIOR ART DISCLOSURE

Agitators in horizontal tanks are known in the art. For example, German Pat. No. 598,029 discloses such device in which so-called beater rods are mounted on a centrally disposed shaft rotating at a speed of 1400 rpm. The grapes are whipped by these beater rods with great force so that the fruit flesh is removed partly by being knocked off and partly by centrifugal action. This device is intended to replace juice presses or the grinding of the berries and in part also to deseed the berries. The cross section of the rods, normal to the agitator axle, is larger than the cross section parallel to the agitator axle. The French patent application No. 72 45 498, now Pat. No. 2,164,762 discloses mixing paddles arranged in a propeller like fashion for conveying the pomace along the longitudinal direction of a tank. None of these prior agitator means, however, is capable of raising and lowering the pomace with the required care.

DETAILED SUMMARY OF THE INVENTION

The tank may be of different cross-sectional shapes. It may, for example, be rectangular or circular cylindrical in cross section in its upper half and the upper portion of the lower half may be circular cylindrical in cross section immediately adjacently followed by a discharge drain of funnel-shaped cross section. In another embodiment of the invention, the tank is circular cylindrical in cross section and at the bottom of the horizontal tank there is installed a discharge auger. The auger may also be positioned in the fluid drain or a trough-shaped drain mounted to the bottom portion of the circular tank.

These embodiments of the invention have the advantage that the wide mixing blades perform an additional function during the evacuation of the tank, namely, transferring the contents of the tank to the region of the discharge auger or screw and prevent bridge formation of the pomace above the screw.

In some embodiments of the invention, the agitator shaft may be centrally disposed in the tank. In other embodiments, the agitator shaft is disposed eccentrically, for example, somewhat lower. In this case, the distance of the blade tips from the inner wall surface varies along the perimeter of the agitator. Since the distance of the blade tips from the inner wall surface is the smallest in the lowermost portion of the tank and in the region of the discharge screw, the arrangement of the agitator shaft below the symmetry axis of the tank has the particular advantage that the agitator, during the evacuation of the tank, works the pomace into the region of the discharge screw.

In this embodiment, where the agitator shaft is disposed below the axis of symmetry, it is of no consequence that the space between the blade tips and the inner wall surface in the uppermost region of the tank is relatively large. For one thing, when fermenting red grape must, the container is not completely filled, usually only up to 70% of its capacity, because the pomace swells up during the fermentation process and fills out the remaining tank space. Furthermore, the pomace cap accumulating on the surface of the juice is broken up into individual pieces by the blades and punched down into the juice if the blades do not extend full length up to the top of the tank. When processing white grape must, the tank is filled to capacity or nearly so with must; but also in this case, satisfactory mixing and blending is achieved even if the mixing blades do not extend completely into the uppermost portion of the tank.

It has been mentioned previously that wide mixing blades have the additional advantage that they facilitate passage of the tank contents toward the discharge screw as the tank is being emptied. Moreover, this type of wide mixing blades may readily be enlarged in their edge portions an extent such that the job of transferring the tank contents to the discharge screw may be performed the full length of the tank without leaving gaps. To this end, one embodiment of the invention provides for the free ends of the mixing paddles, which are spaced along the agitator shaft and offset with respect to each other, to be increased in width an amount such that the blade ends put side by side cover the full length of the tank.

The wide bodied mixing blades may also be increased in length, according to another embodiment of the invention, in which the agitator shaft is centrally disposed in the circular tank. In this instance, the mixing blades reach up to close to the inner wall, and the blade ends are provided with stripping or scraping means made of an elastic material, such as plastic or rubber, which are in engagement with the inner wall surface. Thus, the agitator blades are able to scrape off the cylindrical inner surface of the tank, whereby the resiliency of the scrapers compensates for any dimensional shifting that the tank walls may undergo at varying load or temperature conditions.

Instead of an enlargement of the blade ends, other embodiments of the invention provide for a connecting web between two agitator blades disposed on the agitator shaft and pitched at the same angle. Such web likewise carries scarping means of a resilient material for engaging the inner wall surface of the tank to remove and transfer into the range of the discharge screw any pomace that may have settled on the wall.

In some embodiments of the invention, the mixing blades are pitched at an angle of 180° with respect to each other, so that two of the mixing blades are always exactly diametrically opposite each other. When connecting this type of mixing blades by the previously mentioned webs, the paths of action of the scrapers on the interior tank wall will overlap. This embodiment has the particular advantage that for the purpose of cleaning the tank, the agitator shaft may be so adjusted that the blades are oriented vertically upwardly and downwardly. The downwardly pointing agitator blades are thus in the region of the discharge drain and their extremities project into free space. In this position of the blades, the entire wall surface is freely accessible without obstruction by the blades, with the exception of the uppermost point in the tank wall.

In other embodiments of the invention, the blades may be offset to each other by a different angle. For example, the agitator blades may be arranged on the agitator shaft along a helix and may be angularly offset by a total of 360°, that is, they may be thought of as being disposed in a similar manner as the steps of a spiral staircase. The advantage of this embodiment of the invention resides in the feature that never more than one agitator blade will come into contact with the pomace cap at any one time, but rather, the agitator blades are allowed to exercise maximum torque at different times thereby preventing any heavy blows to the bearing of the agitator shaft and ensuring that a drive assembly of relatively small capacity may effectively be used for the agitator.

The agitator blades may be radially disposed on the agitator shaft in a straight line or at an angle to the radius, or they may be curved or bent in order to be able to impart to the tank contents, at the appropriate direction of rotation, additionally a radially inwardly or, as the case may be, a radially outwardly directed motion.

BRIEF DESCRIPTION OF THE DRAWINGS

Various illustrative embodiments of the invention are represented in the drawings, in which:

FIG. 1 is a front view of a first embodiment of a tank according to the invention.

FIG. 2 is a sectional view of the tank of FIG. 1 taken along the line II—II.

FIGS. 3a and 3b illustrate embodiments of agitator blades.

DETAILED DESCRIPTION OF ILLUSTRATIVE EMBODIMENTS

Figure 4:
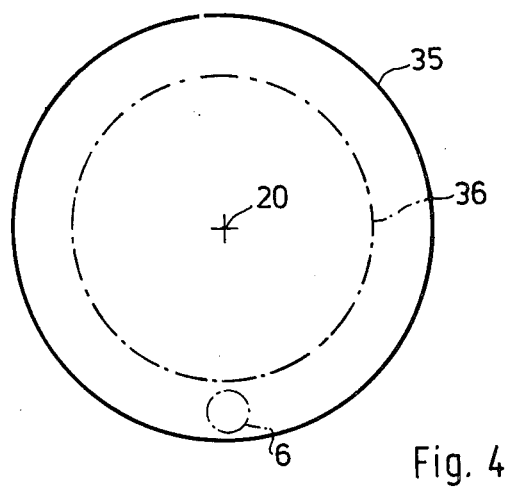
FIG. 4 is another embodiment of a tank.

While FIGS. 1 and 4 substantially merely represent cross sections of tanks according to the invention, they also indicate the agitator shafts and schematically indicate the perimeters traced out by the agitators, that is, the extreme line bounding the space covered by an agitator.

FIGS. 1 and 2 show a container or tank 1 being substantially circular-cylindrical in cross section and having a horizontally extending longitudinal axis, that is, the tank is horizontal in attitude. The tank is supported on the floor by upright elements consisting of studs 2 and columns 3. The bottom portion of the circular cylindrical shell 4 of the tank is provided with an approximately trough-shaped drain or channel 5 extending the entire length of the tank and having disposed therein a discharge or conveyor screw 6, by means of which the less flowable constituents of the tank contents are discharged through a discharge neck 8 as an extension of the conveyor screw 6, when a gate 9 is opened which is only intimated in the drawing. The conveyor screw 6 is operated by drive means disposed at the side opposite the discharge neck 8 and extending past the rear wall 10 of the tank 1 in the illustrated embodiment, such drive means consisting of an electric motor 11. The conveyor screw 6 is positioned outside the circular cylinder constituted in its major portion by the shell 4. The top of the tank 1 is provided with an inlet opening 12.

Supported in the rear wall 10 and the front wall 11 of the tank 1 is the shaft 16 of an agitator 17. The walls 10 and 11 are, as a rule, curved outwardly in a manner not shown. The axis of rotation of the agitator 17, i.e. the shaft 16, is disposed horizontally at a distance from the axis 20 of the cylindrical shell 4, namely exactly below the axis 20. This distance between shaft 16 and axis 20 is so selected that a predetermined minimum distance is ensured between the portion of the agitator 17 farthest radially outwardly and the shell 4, taking into consideration the radial dimensions of the agitator in an area 22 of the cylindrical shell 4 which is located in close proximity to the discharge drain 5. While this minimum distance may vary according to the particular use to which the tank is being put, and also according to production tolerances as well as deformations of the shaft that may occur during operation, a range of approximately 5 mm to 150 mm is suggested. This distance between the radial extremity of the agitator and the inner surface of the shell 4 increases from the area 22 upwards until it reaches a maximum width in the region of the apex of the tank 1. In the embodiment of FIG. 1, this distance in the region of the apex of the tank 1 amounts to approximately 15 to 20% of the diameter of the cylindrical portion of the tank 1.

The agitator 17 is operated by drive means 27 and is provided with a plurality of agitator blade or paddle rods 25 axially spaced on the shaft 16. The rods are all of the same length and are offset with respect to each other along a helical line.

In the illustrated example, the helically offset arrangement covers an angle of nearly 360°, so that after completion of a rotational movement of 45° by each one of the eight agitator arms or rods 25 provided in this embodiment, one of the rods 25 is directed straight upwardly. The more agitator rods there are on a 360° helix, the steadier is the force of the drive means required for a uniformly rapid rate of rotation of the agitator when a relatively solid cake of pomace has built up in the upper portion of the tank 1 putting up considerable resistance to being cut by the agitator blades.

The agitator arms or rods 25 of the embodiment of FIGS. 1 and 2 are paddle or blade-shaped, with the paddles or blades being flat or plane and the plane of the blades being parallel to the axial direction of the shaft 16 and radial thereto. This form of agitator blades 25 is illustrated in FIG. 1 where the front wall 15 is broken away. It would also be possible and may be advantageous in some cases to keep the agitator rods 25 paddle or blade-shaped, but to impart a curve or angular bend or break at least to their extreme end zones, oriented in the direction of rotation, as it is indicated in FIG. 3a showing the agitator blade 28, and in FIG. 3b showing the agitator blade 29. In both FIGS. 3a and 3b, the direction of rotation of the agitator is indicated by an arrow 30. For simplicity of the drawing, merely two agitator blades are shown in these figures.

By virtue of the described curved or angularly bent end sections of the blades, portions of the tank contents coming into contact with the blade ends are conveyed in a direction approximately radially inwardly, thus further promoting the mixing of the red wine pomace floating on the surface of the fluid with the body of the juice itself.

FIG. 1 also indicates the circular path 32 described by the extreme ends 33 of all of the agitator blades 25, as viewed in the direction of FIG. 1. In the embodiment shown in FIG. 4, the individual agitator blades are omitted while merely indicating the circular range of the agitator.

In the embodiment of FIG. 1, near the lowermost section of the cylindrical shell 4 and to the left of the drain 5, a juice receptacle or pan 40 is provided in a depression in the shell 4. The juice pan 40 extends over a considerable part of the length of the tank 1. In its interior, spaced from the cylindrical surface of the shell 4, the juice pan 40 is provided with a slotted plate 41 permitting the juice to pass through but retaining the pomace. The juice is discharged from the juice pan 40 through an outlet port 42 and flows off through suitable conduits.

In the embodiment of FIG. 4, the horizontal tank 1 is of circular cross section normal to the axis 20. The agitator shaft is centrally disposed, that is, it is coaxial with the symmetry axis 20. The perimeter of the agitator is designated 36. Located at the bottom of the tank is the discharge screw 6. The paddles or agitator blades 25, 28 and 29 are shorter than the radius of the cylindrical shell 35 of the tank 1 by an amount equal to at least the diameter of the discharge screw 6.

In some embodiments of the invention, the agitator paddles or blades are not helically arranged and offset with respect to each other on the agitator shaft, but are pitched at an angle of 180°. Especially in this embodiment, two agitator blades pitched at the same angle of the agitator shaft may be connected at their extreme ends by a web.

The agitator paddles or blades may also have a shape different from the one illustrated. In particular, it is possible to impart the increased width of the blades, as it is shown in FIG. 2, substantially only to the end portion of the paddle or blade, while making them narrower in their radial middle portion 47, for example, making them circular in cross section. Further, the agitator blades illustrated in FIG. 2 may be provided at their ends with arms extending parallel to the shaft 16, or may be widened in some other manner. For instance, the paddle or blade ends 48 may be placed side by side so that the entire length of the cylindrical portion of the tank is covered.

Figure 5:
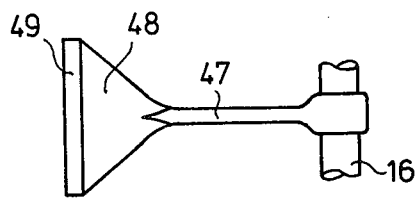
FIG. 5 is a top plan view of an embodiment of an agitator blade.

It has been pointed out previously that in the embodiment of FIG. 1 the distance of the agitator blade tips from the tank wall is smallest in the area 22. In this area of closest proximity of the agitator blades to the tank wall, the blades are in a position to scrape along the inner wall surface so that in the area 22, where the tank wall is relatively flat sloped, no pomace is allowed to settle but is scooped up by the agitator blades and conveyed into the range of the discharge screw 6. The scraping or stripping effect of the agitator paddles or blades may be enhanced by scraping means 49 of an elastic material, such as rubber or plastic, which are attached to webs between agitator blades set on the shaft 16 at identical angles, or in accordance with FIG. 5, to sweep along the inner surface of the tank. In these embodiments of the invention, the discharge screw 6 is installed in a drain 5 outside the circular range of the agitator, as shown in FIG. 1. In the embodiment, in which the agitator blade tips are provided with scrapers, the agitator shaft may be centrally located along the axis of symmetry 20 of the tank, in which case the entire cylindrical inner surface of the tank is covered by the scrapers. In other embodiments, where the agitator shaft 16 is positioned below the symmetry axis 20, as shown in FIG. 1, the scraping action is confined to the area 22 in FIG. 1.

If the agitator is intended to merely break up the pomace cap floating on top of the juice and punch it back down into the body of the juice, the agitator may operate at a very low speed of perhaps ½ to 20 revolutions per minute, the agitator diameter being between 1.00 and 5.00 m. If during or after the extraction of the juice the agitator is intended to prevent the buildup of pomace on flat wall sections or to convey such pomace into the range of the discharge screw, the agitator is operated at a somewhat higher speed of, say, at least 10 r.p.m.

The tank may be made of steel, particularly of corrosion resistant stainless steel, or of a suitable plastic material. The front and rear walls of the container may be slightly curved for reasons of stability; these curvatures have been omitted from the drawings for the sake of simplicity.

Figure 6:
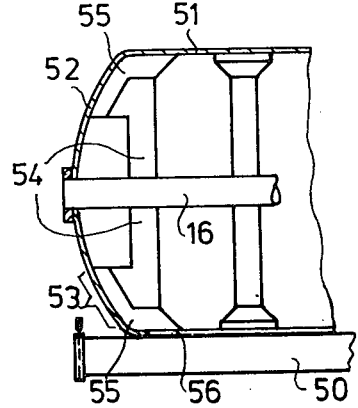
FIG. 6 is a sectional view, similar to FIG. 2, of another embodiment of the invention.

FIG. 6 illustrates a portion of an embodiment of a horizontal tank having curved front walls 52. The discharge drain 50 projects past the joint between the cylindrical section 51 and the curved front wall 52 and is provided at its end with a closure, such as a gate or the like. In order to prevent pomace from settling in the area 53 when the tank is being emptied, the agitator shaft 16 is provided in the proximity of the curved front wall with two, possibly additional, paddles or blades 54, the leading ends of which being shaped to accommodate the configuration of the inner surface of the front wall 52 and, again, being provided with scrapers 55 made of an elastic material. The side of the scraper 55 or of the paddle or blade 54 facing the wall extends obliquely to the plane of the agitator shaft 16, so that the pomace is moved in the direction of rotation of the shaft 16 inwardly into a region which is in communication with the opening 56 leading from the cylindrical tank portion 51 to the discharge drain 50.

I claim:

1. A horizontal tank-type wine fermentation container for the processing of wine grape must, in which the must includes grape juice with a pomace cake floating on the juice, said container comprising a generally circular-cylindrical fermentation tank having a generally horizontal longitudinal cylindrical axis, a rotary agitator rotatable in said tank about a rotary axis parallel to said cylindrical axis of said tank, said agitator including a rotary shaft having a plurality of longitudinally spaced agitator paddles extending outwardly from said shaft and disposed along the full length of said shaft, power means for rotating said agitator shaft at a slow rotary speed ranging from one half to twenty revolutions per minute, said agitator paddles including at least outer sections having a cross-sectional width parallel to the agitator axis and a cross sectional thickness transverse to said width, said cross sectional width parallel to the agitator axis being much greater than said cross-sectional thickness, whereby said paddles efficiently break up the pomace cake into pieces and efficiently propel such pieces through the grape juice component of said wine grape must, said agitator having a large diameter ranging between one and five meters, said tank having a generally trough-shaped drain portion projecting downwardly therefrom, said drain portion having a partial circular-cylindrical shape, and a rotary discharge screw installed in said trough-shaped drain portion, said drain portion having a discharge opening therefrom.

2. A wine fermentation container according to claim 1, in which said agitator paddles including said outer sections also include inner sections between said agitator shaft and said outer sections, said outer sections being substantially wider than said inner sections of said paddles.

3. A wine fermentation container according to claim 1, in which said agitator paddles extend into close proximity to the interior wall surface of said tank, said outer sections of said paddles having tip portions provided with scrapers of an elastic rubber-like material to enable said scrapers to engage and scrape the interior wall surface.

4. A wine fermentation container according to claim 1, in which two of said agitator paddles are disposed on said agitator shaft and are pitched at the same angle relative to each other, the outer sections of said two agitator paddles having a web extending therebetween, said web having a tip portion with a scraper attached thereto and made of an elastic rubber-like material to enable said scraper to engage and scrape the interior wall surface of said tank.

5. A wine fermentation container according to claim 1 or 3, the rotary axis of said agitator shaft being located below the cylindrical axis of said tank.

6. A wine fermentation container according to claim 1, in which said agitator paddles are oriented at an angle of 180° to each other.

7. A wine fermentation container according to claim 1, in which said agitator paddles are arranged in a helix pattern along said agitator shaft and are offset relative to one another at angular intervals totalling 360°.

8. A wine fermentation container according to claim 1, in which said outer sections of said agitator paddles are bent in the direction of rotation for efficiently propelling the pieces of pomace cake radially inwardly.

9. A wine fermentation container according to claim 1, in which said tank is provided with curved end walls, at least one of said agitator paddles being mounted on said agitator shaft adjacent one of said curved end walls and being shaped in conformity with said curved end wall to sweep over an annular section of said curved end wall.

10. A wine fermentation container according to claim 9, in which said one agitator paddle adjacent said one curved end wall is provided with a scraper for scraping said one end wall.

11. A wine fermentation container according to claim 9 or 10, in which said one agitator paddle adjacent said one curved end wall is oriented at an oblique angle with respect to a radial plane in which the agitator axis is located, said oblique angle causing said one agitator paddle to deflect material away from said end wall.

12. A horizontal tank-type wine fermentation container for the processing of wine grape must, in which the must includes grape juice with a pomace cake floating on the juice, said container comprising a generally circular-cylindrical fermentation tank having a generally horizontal longitudinal cylindrical axis, a rotary agitator rotatable in said tank about a rotary axis parallel to said cylindrical axis of said tank, said agitator including a rotary shaft having a plurality of longitudinally spaced agitator paddles extending outwardly from said shaft and disposed along the full length of said shaft, power means for rotating said agitator shaft at a slow rotary speed ranging from one half to twenty revolutions per minute, said agitator paddles including at least outer sections having a cross-sectional width parallel to the agitator axis and a cross sectional thickness transverse to said width, said cross-sectional width parallel to the agitator axis being much greater than said cross-sectional thickness, whereby said paddles efficiently break up the pomace cake into pieces and efficiently propel such pieces through the grape juice component of said wine grape must, said agitator having a large diameter ranging between one and five meters, said tank having a generally trough-shaped drain portion projecting downwardly therefrom, said drain portion having a partial circular-cylindrical shape, and a rotary discharge screw installed in said trough-shaped drain portion, said drain portion having a discharge opening therefrom, said agitator paddles extending into close proximity to the interior wall surface of said tank, said outer sections of said paddles having tip portions provided with scrapers of an elastic rubber-like material to enable said scrapers to engage and scrape the interior wall surface, the rotary axis of said agitator shaft being located below the cylindrical axis of said tank.

13. A horizontal tank-type wine fermentation container for the processing of wine grape must, in which the must includes grape juice with a pomace cake floating on the juice, said container comprising a generally circular-cylindrical fermentation tank having a generally horizontal longitudinal cylindrical axis, a rotary agitator rotatable in said tank about a rotary axis parallel to said cylindrical axis of said tank, said agitator including a rotary shaft having a plurality of longitudinally spaced agitator paddles extending outwardly from said shaft and disposed along the full length of said shaft, power means for rotating said agitator shaft at a slow rotary speed ranging from one half to twenty revolutions per minute, said agitator paddles including at least outer sections having a cross-sectional width parallel to the agitator axis and a cross-sectional thickness transverse to said width, said cross-sectional width parallel to the agitator axis being much greater than said cross-sectional thickness, whereby said paddles efficiently break up the pomace cake into pieces and efficiently propel such pieces through the grape juice component of said wine grape must, said agitator having a large diameter ranging between one and five meters, said tank having a generally trough-shaped drain portion projecting downwardly therefrom, said drain portion having a partial circular-cylindrical shape, and a rotary discharge screw installed in said trough-shaped drain portion, said drain portion having a discharge opening therefrom, said agitator paddles extending into close proximity to the interior wall surface of said tank, said outer sections of said paddles having tip portions provided with scrapers of an elastic rubber-like material to enable said scrapers to engage and scrape the interior wall surface, the rotary axis of said agitator shaft being located below the cylindrical axis of said tank, said tank being provided with curved end walls, at least one of said agitator paddles being mounted on said agitator shaft adjacent one of said curved end walls and being shaped in conformity with said curved end wall to sweep over an annular section of said curved end wall, said one agitator paddle adjacent said one curved end wall being provided with a scraper for scraping said one end wall.

* * * * *